US008793656B2

(12) United States Patent
Huang et al.

(10) Patent No.: US 8,793,656 B2
(45) Date of Patent: Jul. 29, 2014

(54) METHOD AND APPARATUS FOR REGRESSION TESTING SELECTION FOR A FRAMEWORK-BASED APPLICATION

(75) Inventors: Sheng Huang, Shanghai (CN); Shao C. Li, Beijing (CN); Zhong J. Li, Beijing (CN); He H. Liu, Beijing (CN); Hua F. Tan, Beijing (CN); Jun Zhu, Beijing (CN); Wei Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/978,037

(22) Filed: Dec. 23, 2010

(65) Prior Publication Data

US 2011/0161936 A1 Jun. 30, 2011

(30) Foreign Application Priority Data

Dec. 28, 2009 (CN) ...................... 2009 1 0265277 A

(51) Int. Cl.
*G06F 9/44* (2006.01)
*G06F 9/45* (2006.01)
(52) U.S. Cl.
USPC ........................... 717/124; 717/130; 717/144
(58) Field of Classification Search
None
See application file for complete search history.

(56) References Cited

U.S. PATENT DOCUMENTS

| | | | | |
|---|---|---|---|---|
| 7,257,804 B2 * | 8/2007 | Baecker et al. | ............... | 717/130 |
| 7,296,261 B2 * | 11/2007 | Witchel et al. | ................ | 717/144 |
| 7,712,087 B2 * | 5/2010 | Kogan et al. | .................. | 717/130 |
| 7,730,458 B2 * | 6/2010 | Isakov et al. | .................. | 717/130 |
| 7,735,066 B1 * | 6/2010 | Myers et al. | ................... | 717/130 |
| 7,823,134 B2 * | 10/2010 | Agarwal et al. | ............... | 717/130 |
| 7,958,400 B2 * | 6/2011 | Ur | ................................. | 717/124 |
| 8,473,916 B2 * | 6/2013 | Venkatraman et al. | ....... | 717/124 |
| 8,589,884 B2 * | 11/2013 | Gorthi et al. | .................. | 717/144 |
| 2005/0044525 A1 * | 2/2005 | Lazarov | ....................... | 717/104 |
| 2006/0070048 A1 * | 3/2006 | Li et al. | .......................... | 717/144 |
| 2006/0225041 A1 * | 10/2006 | Girolami-Rose | ............. | 717/124 |

(Continued)

FOREIGN PATENT DOCUMENTS

CN 1952818 4/2007

OTHER PUBLICATIONS

Mansour et al., "Regression Test Selection for C# Programs", May 23, 2009 Hindawi Publishing Corporation, Advances in Software Engineering, vol. 2009, Article ID 535708, 10 pages; <http://www.hindawi.com/journals/ase/2009/535708/>.*

(Continued)

*Primary Examiner* — Thuy Dao
*Assistant Examiner* — Ben C Wang
(74) *Attorney, Agent, or Firm* — Vazken Alexanian

(57) ABSTRACT

A selection method and related application is provided for a framework-based application having programming applications with both language program files and configuration files. In one embodiment, the method comprises abstracting a frame configuration model instance by analyzing configuration files prior to any modifications made to the program. The frame configuration model instance denoting individual configuration nodes in the framework model and further defining relationship between one or more code units in the configuration nodes and program code units in the application. Then one or more control test cases are constructed by profiling select test cases of the application, wherein the control flow consists of code units traversed during test case execution and control flow of said code units. Subsequently, an extended control flow is obtained by correlating configuration nodes in the framework configuration model instance with the code units in said control flow.

16 Claims, 6 Drawing Sheets

(56) References Cited

U.S. PATENT DOCUMENTS

| | | | | |
|---|---|---|---|---|
| 2007/0240116 | A1* | 10/2007 | Bangel et al. | 717/124 |
| 2007/0257715 | A1* | 11/2007 | Semerdzhiev et al. | 327/141 |
| 2010/0287534 | A1* | 11/2010 | Vangala et al. | 717/124 |
| 2011/0016451 | A1* | 1/2011 | Gorthi et al. | 717/124 |
| 2011/0016452 | A1* | 1/2011 | Gorthi et al. | 717/124 |
| 2012/0030651 | A1* | 2/2012 | Kemmler et al. | 717/124 |

OTHER PUBLICATIONS

Huang et al., "A Novel Approach to Regression Test Selection for J2EE Applications", 2011 IEEE, pp. 13-22; <http://ieeexplore.ieee.org/xpl/mostRecentIssue.jsp?punumber=6068277>.*

Sheng Huang et al., "An Optimized Change-Driven Regression Testing Selection Strategy for Binary Java Applications", Mar. 8, 2009, ACM, pp. 558-565; <http://dl.acm.org/citation.cfm?doid=1529282.1529403>.*

Sheng Huang et al., "ORTS: A Tool for Optimized Regression Testing Selection", Oct. 25, 2009 ACM, pp. 803-804; <http://dl.acm.org/citation.cfm?doid=1639950.1640023>.*

Sheng Huang et al., "A Novel Approach to Regression Test Selection for J2EE Applications", 2011, IEEE, pp. 13-22; <http://ieeexplore.ieee.org/stamp/stamp.jsp?tp=&arnumber=6080768>.*

Sheng Huang et al., "An Optimized Change-Driven Regression Testing Selection Strategy for Binary Java Applications", Mar. 8, 2009, ACM, pp. 558-565; <http://dl.acm.org/results.cfm?h=1&cfid=417702354&cftoken=80698340>.*

Sheng Huang et al., "ORTS: A Tool for Optimized Regression Testing Selection", Oct. 25, 2009 ACM, pp. 803-804; <http://dl.acm.org/results.cfm?h=1&cfid=417702354&cftoken=80698340>.*

Sriram Kuchimanchi, "Towards a Regression Test Selection Technique for Message-Based Software Integration", Dec. 2004, University of New Orleans, pp. 1-66; <http://scholarworks.uno.edu/td/189/>.*

Harrold MJ, Jones JA, Li T, Liang D, Gujarathi A. 2001. Regression Test Selection for Java Software. OOPSLA '01 Proceedings of the 16th ACM SIGPLAN conference on Object-oriented programming, systems, languages, and applications. SIGPLAN Not. 312-326.

Korhonen J, Salmela M, Kalaoja J. 2000. The reuse of tests for configured software products. VTT Publications 406. Technical Research Centre of Finland.

Qu X, Cohen MB, Rothermel G. 2008. Configuration-Aware Regression Testing: An Empirical Study of Sampling and Prioritization. ISSTA '08 Proceedings of the 2008 international symposium on Software testing and analysis. SIGPLAN Not. 75-86.

Yilmaz C, Cohen MB, Porter AA. 2006. Covering Arrays for Efficient Fault Characterization in Complex Configuration Spaces. IEEE Transactions on Software Engineering, vol. 32, No. 1. 20-34.

Gomez E, Krames G, Kubr H. 2006. Automating the regression testing of a mission control system. SpaceOps 2006 Confrence, American Institute of Aeronautics and Astronautics 2006-5704. 1-21.

* cited by examiner

METHOD AND APPARATUS FOR REGRESSION TESTING SELECTION FOR A FRAMEWORK-BASED APPLICATION

CROSS REFERENCES

This application takes priority from foreign filed application CN 200910265277.6 filed Dec. 28, 2009. That application is incorporated by reference herein.

BACKGROUND OF THE INVENTION

1. Field of the Invention

The present invention relates generally to regression testing techniques used for computer applications and more particularly to those regression testing techniques that provide testing selection features for a framework-based computer application.

2. Description of Background

Selective regression testing involves retesting a software application using a subset of the features offered by the entire test suite. This type of testing is designed to ensure that any modifications made subsequently do not have an adverse impact on the integrity of the any of the on existing functions, especially those that are required as per the application specifications. Regression testing selection refers to the subset of functions selected from the entire test suite for further testing. In many traditional regression testing techniques, such as those used for commercial Java applications, the subset tests are selected from those test cases which traverse the change points of pure Java code. In such an approach, an execution trace monitor technique is used to obtain the execution trace of the application. In addition, static program analysis techniques are also used, such as those programs that include graphs, path analysis, data flows, graph walks, firewall and others. These techniques are used to analyze the impact of program modifications, so as to determine whether each test case traverses a function impacted by the modifications, and to further select the test cases that need to be re-executed.

Unfortunately, traditional regression testing selection methods are only suitable in instances where the application logic is embedded in the code itself, such as in case of traditional Java applications. This type of test, is not suitable when the application logic can also exist in the frame configuration files, such as in Java Enterprise Edition (J2EE) application (e.g., configuration files of frames of Spring, Struts, iBatis etc.). This is because, any modifications made to the program is not limited to the functionality of the program code alone but also to proper execution of the configuration files. Therefore, in selecting a subset of regression test cases consideration should be given to situations that may affect code as well as configuration files. Unfortunately, prior art currently being practiced can only provide for regression testing techniques that deal with changes in the code. These techniques cannot deal with changes in the configuration files. Accordingly, the prior art practice currently in use is to re-execute all the test cases when changes happen in configuration files. The latter is not only time consuming, but also is an ineffective way of testing for such scenarios since regression test cases have to be selected and tested manually, resulting in poor test coverage and errors due to missed test case scenarios.

Consequently, it is desirable to implement regression testing techniques that can test both for logic modification that may be embedded either in the configuration files or in the code itself.

SUMMARY OF THE INVENTION

The shortcomings of the prior art are overcome and additional advantages are provided through the provision of a regression testing selection method and related application for a framework-based application having programming applications with both language program files and configuration files. In one embodiment, the method comprises abstracting a frame configuration model instance by analyzing configuration files prior to any modifications made to the program. The frame configuration model instance denoting individual configuration nodes in the framework model and further defining relationship between one or more code units in the configuration nodes and program code units in the application. Then one or more control test cases are constructed by profiling select test cases of the application, wherein the control flow consists of code units traversed during test case execution and control flow of said code units. Subsequently, an extended control flow is obtained by correlating configuration nodes in the framework configuration model instance with the code units in said control flow.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

FIGS. 1 through 6 provide different embodiments of the present invention in which a method and correlated apparatus is provided for regression testing selection used on a framework based application that includes both (language) program files and configuration files. In one embodiment, a method is used that can base the selection process on extracting a frame configuration model instance by analyzing the configuration files of the framework-based application. The frame configuration model instance describes the configuration nodes in the frame configuration of the application and the relationships between them and the code units comprised in the configuration nodes; constructing a control flow of a test case in the test suite by executing the test case in the test suite and using trace monitoring. The control flow comprises the program code units traversed by the test case in the execution process and the control flow relationship thereof; and obtaining an extended control flow of the test case by correlating the configuration nodes in the frame configuration model instance with the program code units in the control flow.

For ease of understanding, in conjunction with explanations made as to the different embodiments of the present invention, by way of example a J2EE application is used. However, it should be understood that this example is only provided as an aid to discuss different embodiments and subtleties of the invention and as can be appreciated by those skilled in the art, different and alternative applications can be replaced with the J2EE example. Therefore as appreciated by those skilled in the art, the present invention is not limited to the specific details of the J2EE application, and the embodiment based on the J2EE application can be definitely extended to other framework-based applications.

Figure 1:
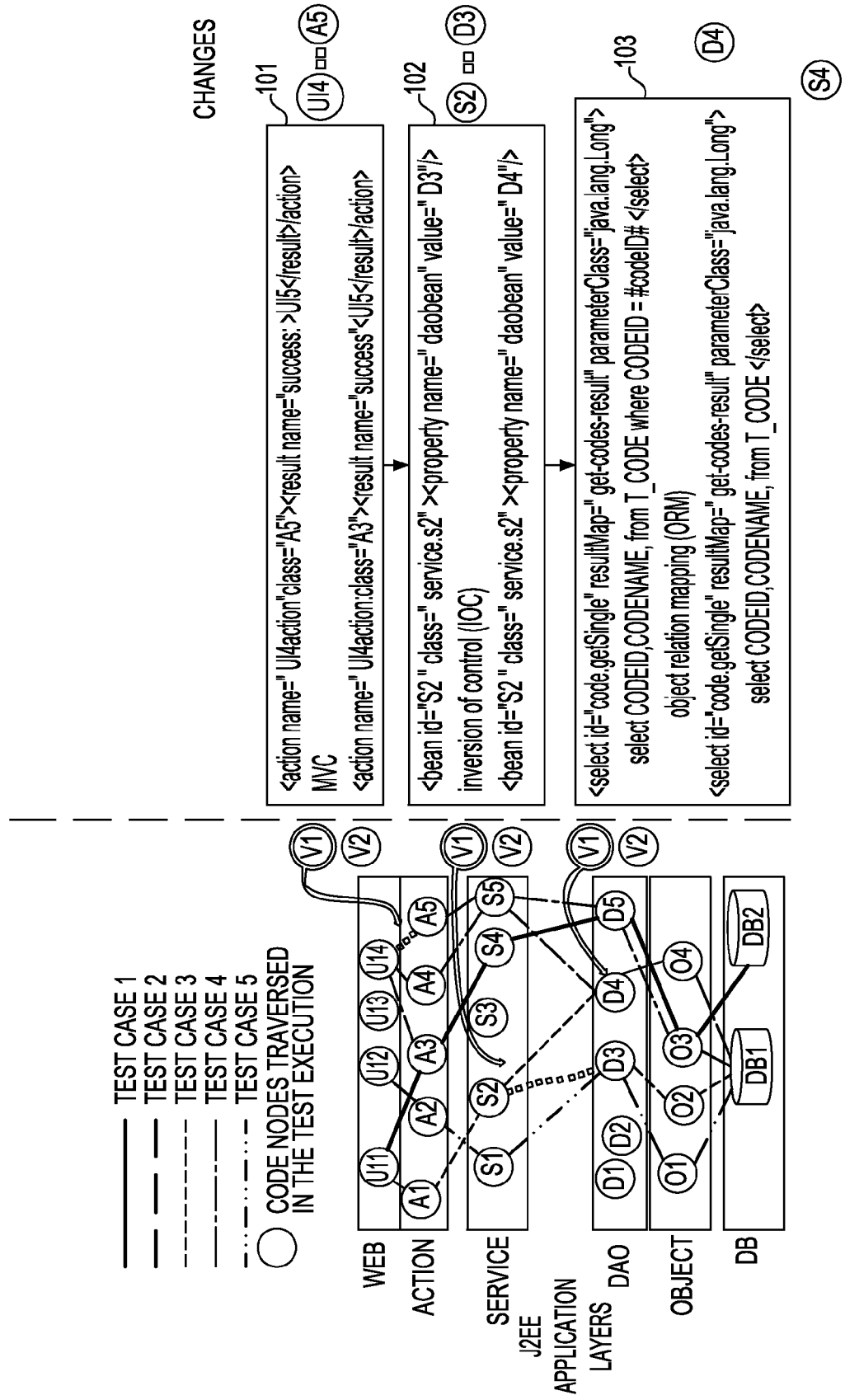
FIG. 1 is a schematic illustration of a J2EE application with modifications to the configuration files that can impact the program testing execution.

FIG. 1 is a schematic illustration showing a J2EE application. FIG. 1 also enhances the impact of modifications made in the configuration files on the overall program testing execution. As shown, the J2EE application has the following 6 layers: Web, Action, Service, data access object (DAO), Object and data base (DB) layers, each layer includes their respective program code units. the web layer is Java Server pages (JSP). When the user submits an ActionForm by the JSP so as to interact with the application, the Struts frame will transmit the ActionForm to the specific Action class in the Action layer according to the configuration in the configuration file struts-config.xml. When the Action class execution is completed, the result string will lead the application to the next JSP according to the configuration in the same configuration file. The left side of the figure shows 5 test cases and their control flows; the right side of the figure shows the configuration fragments. As known by those skilled in the art, the control flow of a test case refers to the set of program code units which are called during the execution process of the test case and the control flow relationships between the program code units. The control flow of a test case can be represented by a control flow graph, in which the nodes denote program code units, while the edges between the nodes indicate the control flow relationships between the program code units.

As shown in FIG. 1, the control flow of the test case 1 is UI1→A3→S4→D5→O3→DB2; the control flow of the test case 2 is UI4→A5→S5→D5→O3→DB1; the control flow of the test case 3 is UI1→A1→S2→D3→O2→DB1; the control flow of the test case 4 is UI4→A4→S5→D4→O4→DB1; the control flow of the test case 5 is UI2→A2→S1→D3→O1→DB1. As shown by the configuration file fragment 101, when the ActionForm indicated by the "UI4action" is submitted, the related Action class "A5" will be triggered to process the ActionForm. The hard coded processing result "success" of this operation process will turn the control flow to the JSP "UI5" (not shown). The control flow can be changed by updating the configuration file, in stead of updating the Java code or JSP code. For example, as shown in the Figure, if in the version v2, "A5" in the above configuration file fragment in the version v1 is amended into "A3", the Action class processing the ActionForm "UI4action" will be changed from "A5" to "A3". This means that the test case 2 whose control flow comprises UI4→A5 needs to be re-executed during the regression testing (the path subsequent to the code unit A3 in the control flow of the test case 2 after the configuration file is modified is not shown).

As shown in the configuration file fragment 102 of FIG. 1, in the service layer, the property of the service bean S2 is "daobean", which is a declaration of a variable of the service bean. Here, "daobean" is an interface. The service bean dynamically calls the implementation of the interface to compose business logics. In the Spring frame, the dependency lookup mechanism makes the dynamic binding configurable. For example, the XML fragment of the Spring configuration file indicates that the interface "daobean" will be instantiated by the DAO class "D3". In other words, any method of the service S2 invoking the method of "daobean" will be dynamically bound to the corresponding implementation method of D3. If as requirement changes, as shown by the configuration file fragment 102 in FIG. 1, the service requires to composite business logic by "D4" in the new version, then update to the configuration file by changing "D3" to "D4" is performed. In order to verify the correctness of the change, the test case 3 traversing the method of D3 through daobean in S2 needs to be rerun.

Now looking at configuration file fragment 103, in the data layer, the ID reference of "code.getsingle" in the DAO class will trigger the execution of the SQL statement "select CODEID, CODENAME, from T_CODE where CODEID=#codeID#" in the configuration file. Suppose, as shown in the figure, the SQL statement is changed to "select CODEID, CODENAME, from T_CODE" in the new version, then the test case 4 traversing the previous SQL statement in the configuration file through D4 will have different behavior, and need to be rerun to verify the update.

In the example shown in FIG. 1, as can be appreciated, the code analysis will reveal that the modification in the program code is only S4, and thus only test case 1 traversing S4 is considered to be re-executed. That is to say, in the traditional regression testing selection method, since only changes in the code is considered, only test case 1 is selected to perform the regression testing, and no other test cases can be selected, which results in poor coverage and increase the risk of program errors due to changes. Since the regression testing selection method of the present invention considers not only changes in the program code, but also changes in the configuration files, test cases 1, 2, 3, 4 can be selected to perform the regression testing, which has a good coverage and can effectively test and correct program errors which may possibly result from modifications to the configuration files.

Some embodiments of the present invention will be now be described with reference to the accompanying drawings as reflected in FIGS. 2 through 6. In the following description, numerous details are described to enable the present invention to be fully understood. However, it is obvious to those skilled in the art that the realization of the present invention can be without some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

Figure 2:
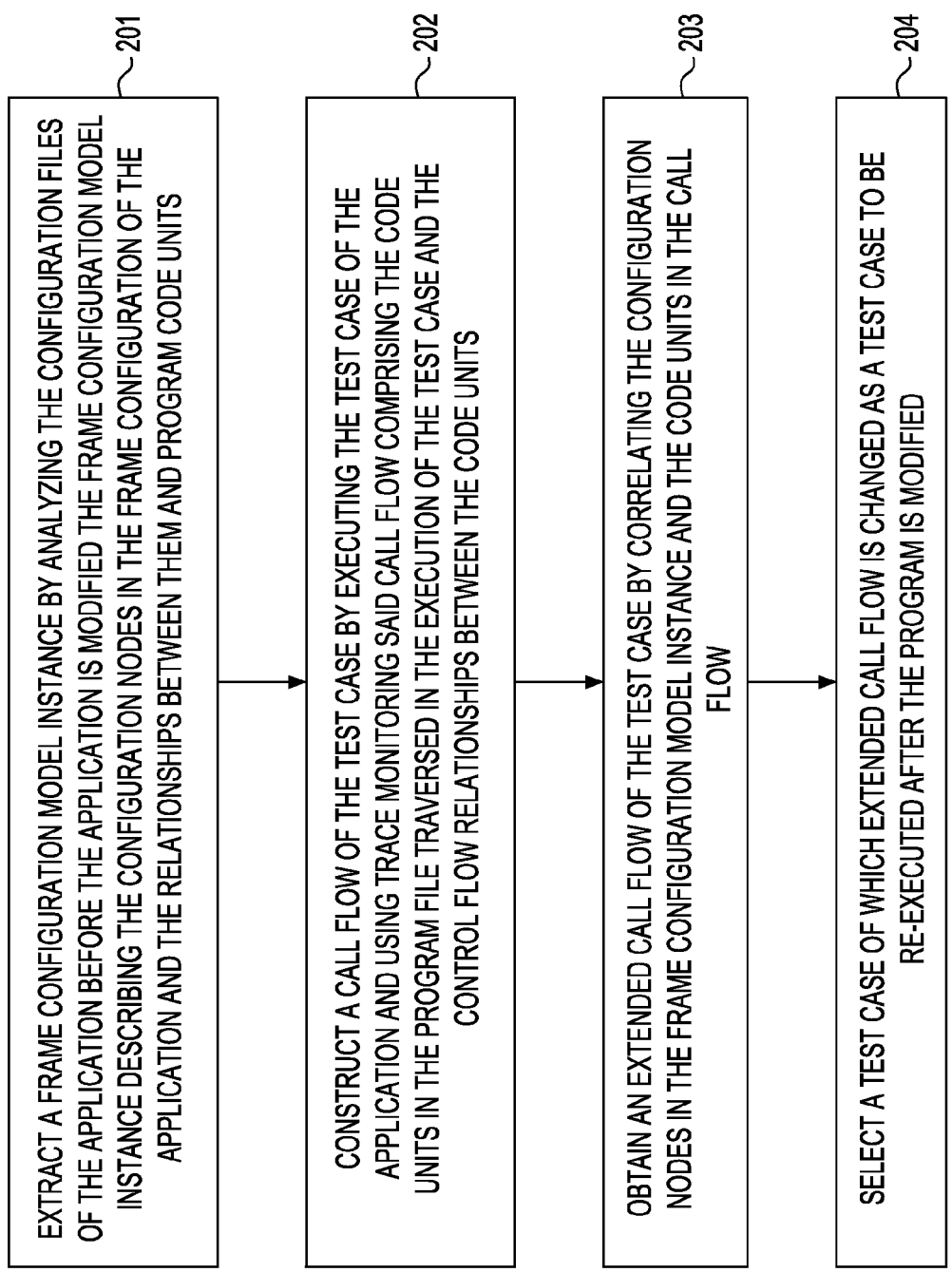
FIG. 2 is a flow chart illustration for regression testing selection of a framework-based application according to one embodiment of the present invention.

Referring now to FIG. 2, a flowchart illustration of the regression testing selection method is provided for a framework-based application according to an embodiment of the present invention. As shown, the method comprises the following steps as will be presently discussed in further details.

In step 201, before the application program is modified, a frame configuration model instance is extracted by analyzing the configuration files of the application, the frame configuration model instance describing the configuration nodes in the frame configuration of the application and the relationships between them and program code units. In step 202, the control flow of a test case of the application is constructed by executing the test case of the application and using trace monitoring. the control flow comprising code units in the program files traversed by the test case during the execution process and the control flow relationships between the code units.

In step 203, an extended control flow of the test case is obtained by correlating the configuration nodes in the frame configuration model instance with the code units in the control flow. Optionally, as shown in step 204, after the application program is changed, a test case of which the extended control flow is changed is selected as the test case to be re-run.

Figure 3:
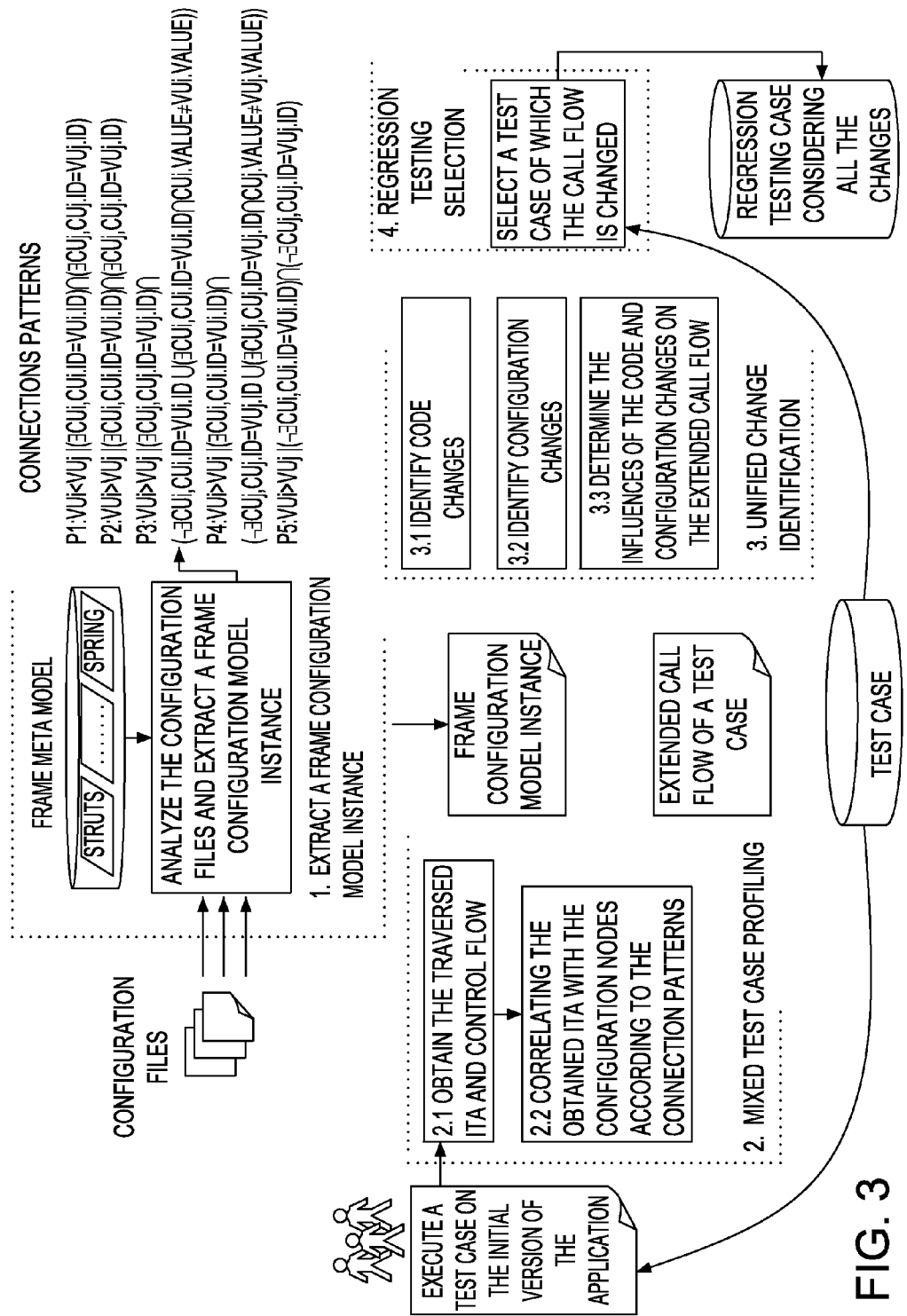
FIG. 3 is a schematic illustration of a regression testing selection for a framework-based J2EE application according to one embodiment of the present invention.

FIG. 3 is an exemplary illustration of a regression testing selection method that utilizes a J2EE application as an example, according to an embodiment of the present invention. As shown, the method shown in this embodiment comprises the following steps as will be presently discussed.

Figure 4:
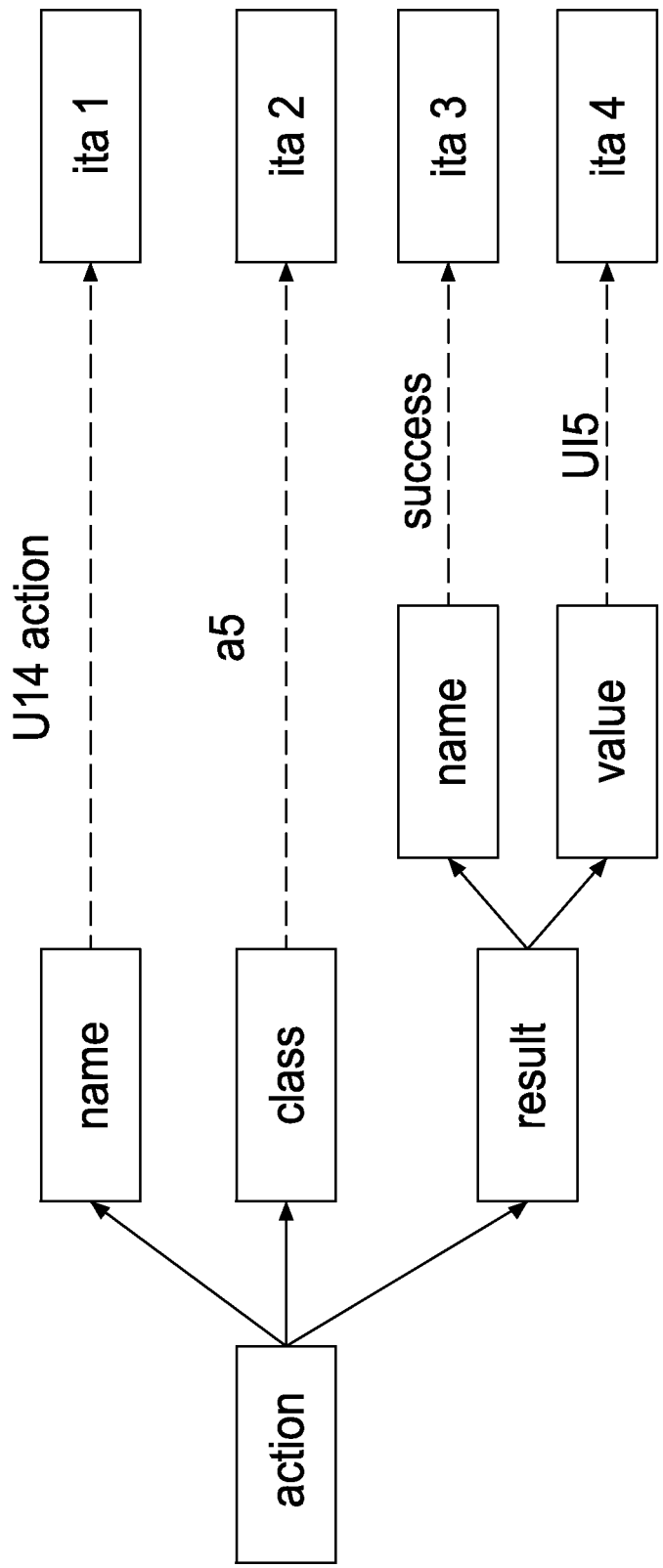
FIG. 4 is an illustration showing an example of a frame fragment configuration model instance as per one embodiment of the present invention.

Step 1 includes the extraction of a frame configuration model instance. The frame configuration model instance is used to describe the virtual code units indicated in the respective configuration nodes in the configuration of the specific J2EE application under a frame (i.e., the code units obtained from the configuration files) and the relationships between them and program code units. The code units (including the virtual code units and the program code units) can be classes, form requests, JSP, functions and variables etc. in the code. The code unit set may be denoted as an ITA (an abbreviation of IT-Artifact, indicating IT artifacts, wherein the ITA can be divided into two parts, one part is program code unit set CU, and the other part is virtual code unit set VU), and a single code unit can be denoted as an ita; where an ita could be CUi (CUi denotes a program code unit), or could be VUi (VUi denotes a virtual code unit). Each frame (e.g., Spring, Struts, iBatis, etc.) specifies the specific structures, syntaxes and semantics of the configuration files belonging to the frame, which can be referred to as the meta model of the frame. To extract the frame configuration model instance, it is needed to analyze the configuration files of the specific J2EE application belonging to the frame according to the structures, syntaxes and semantics of the configuration files specified by the frame, so as to obtain the respective configuration nodes in the configuration files and the relationships between them and the program code units.

for configuration files in the extreme markup language (XML) format, all the second level XML nodes under the XML root node can be regarded as configuration nodes. For example, by analyzing the following Struts configuration file fragment: <action name="UI4action" class="A5"><result name="success">UI5</result>/action>, Therefore, a frame configuration model instance fragment as shown in FIG. 4 can be obtained. The frame configuration model instance fragment includes an action node. By referring to the semantics of Struts, it can be known that the value of the name attribute of the action node denotes an ita "UI4action"; the value of the class attribute of the action node denotes an ita "A5"; the value of the name attribute of the result sub-node of the action node denotes an ita "success"; and the value (VALUE) of the name attribute of the result sub-node of the action node denotes an ita "UI5". These ITAs imply the control flow relationships defined by Struts syntaxes.

In one embodiment of the present invention, the relationships between virtual code units and program code units represented in the J2EE frame configuration model instance can be summarized as 5 universally applicable categories known as connection patterns. That is to say, in any J2EE frames, the relationships between the configuration nodes indicated in configuration files and program code units all belong to one or more of the 5 connection patterns. The formalized expressions of the five connection patterns are as follows;

P1: $VU_i < VU_j | (\exists CU_i, CU_i.ID = VU_i.ID) \cap (\exists CU_j, CU_j.ID = VU_j.ID)$ P2: $VU_i > VU_j | (\exists CU_i, CU_i.ID = VU_i.ID) \cap (\exists CU_j, CU_j.ID = VU_j.ID)$ P3: $VU_i > VU_j | (\exists CU_j, CU_j.ID = VU_j.ID) \cap (\neg \exists CU_i, CU_i.ID = VU_i.ID \cup (\exists CU_i, CU_i.ID = VU_i.ID \cap CU_i.Value \neq VU_i.Value))$ P4: $VU_i > VU_j | (\exists CU_i, CU_i.ID = VU_i.ID) \cap (\neg \exists CU_j, CU_j.ID = VU_j.ID \cup (\exists CU_j, CU_j.ID = VU_j.ID \cap CU_j.Value \neq VU_j.Value))$ P5: $VU_i > VU_j | (\neg \exists CU_i, CU_i.ID = VU_i.ID) \cap (\neg \exists CU_j, CU_j.ID = VU_j.ID)$ wherein, VUi and VUj denote virtual code units expressed in configuration files, respectively; VUi.ID and VUj.ID denote the identifiers of VUi and VUj, respectively; VUi.Value and VUj.Value denote the contents of the code fragments denoted by VUi and VUj, respectively; CUi and CUj denote program code units, respectively; CUi.ID and CUj.ID denote the identifiers of CUi and CUj, respectively; CUi.Value and CUj.Value denote the contents of the code fragments of CUi and CUj, respectively. Here the ID can be a class identifier, JSP identifier, method identifier or string, etc. "<" denotes the relationship of inversion of control, that is to say, if VUi and VUj conform to the connection pattern P1, then when VUi is called, the actual execution of VUi is carried out by executing VUj; ">" denotes a control flow direction, that is, when the program has executed the code unit at the left side of ">", the call to the code unit at the right side of "<" will be triggered. "|" denotes a necessary condition for the pattern to be valid, that is, the pattern is valid only when the formula at the right holds; "∩" denotes the "AND" relationship, that is, the whole expression holds only when the expressions at both sides of the operator hold; "∪" denotes the "OR" relationship, that is, the whole expression holds if either of the expressions at the two sides of the operator holds; "∃" denotes an existence quantifier, and "¬ ∃" denotes a non-existence quantifier.

The connection pattern P1 denotes the relationship of inversion of control between the virtual code unit (VUi) and the virtual code unit (VUj) denoted by the frame configuration. When the application runs to a CUi having the same ID as that of the VUi, it is actually carried out by the execution of the CUj having the same ID as that of the VUj. For example, in the configuration file fragment example 102 shown in FIG. 1, daobean is the VUi in the connection pattern P1, while D3 is the VUj in the connection pattern P1. According to the semantics of the frame of Spring to which these virtual code units belong, it can be known that daoben is an interface variable of the class S2, and D3 is an implementing class of the interface, and the execution of daobean is actually carried out by the execution of D3. Both the virtual code units have program code units having the same IDs in the program code units to correspond thereto.

Furthermore, the connection pattern P2 denotes a control flow relationship between VUi and VUj indicated by the frame. In such a connection pattern, VUi and VUj both can find a CUi and CUj having the same IDs in the program code units to correspond thereto; when the program is executed to VUi, it will trigger the call to the CUj having the same ID with the VUj. For example, in the configuration file fragment example 101 shown in FIG. 1, the virtual code unit "success" and UI5 in the configuration file correspond to the program code unit constant "success" in the action function of the program and the JSP page UI5. Thus, according to the semantics of the Struts frame, during the execution process of the application, the access to the constant "success" will result in the execution of UI5. Here, "success" is the VUi in the connection pattern P2, while UI5 is the VUj in the connection pattern P2, and both the VUs have the corresponding program code units having the same IDs, that is, CUi and CUj.

The connection patterns P3 and P4 denote the control flow relationships between VUi and VUj expressed by the frame, and pattern P3 and pattern P4 are symmetrical. For the connection pattern P4, CUi having the same ID value as that of VUi can be found in the program code, but the program code unit CUj identical with the virtual code unit denoted by VUj (both the IDs and the Values are the same) cannot be found. If the connection pattern P4 is satisfied, when the program is executed to a CUi corresponding to the VUi, the execution of the VUj will be triggered. For example, in the configuration file fragment example 103 shown in FIG. 1, according to the semantics of the frame of Ibatis, the execution of the SQL fragment is triggered by the execution of the program code unit identified as code.getSingle, and the SQL fragment only appears in the configuration file. Here, code.getSingle is the VUi in the connection pattern P4, and the SQL fragment is the VUj in the connection pattern P4. Here the SQL fragment does not have a corresponding program code unit in the program. The connection pattern P3 is similar to the connection pattern P4, and the details are omitted.

Finally, the connection pattern P5 denotes such two virtual code units: neither VUi nor VUj has the corresponding program code unit in the program code, and the frame implies the control flow relationship between the VUi and the VUj. For example, in the configuration file fragment example 103 shown in FIG. 1, from the execution of the SQL fragment to the SQL ResultMap returned by the SQL execution. The two units are both units that only exist in the configuration file. Here, the SQL fragment and the resultMap are VUi and VUj in the connection pattern P5 respectively. The call to the VUj will be triggered when the program is executed to VUi.

Consequently, each configuration node in the frame configuration model instance extracted from the frame configuration files comprises one or more of the above 5 connection patterns. In this first step, by referring to the semantics of each frame, the frame configuration model can be extracted. The formalized expression of the frame configuration model can be as follows:

Frame Configuration Model:
FC={NODE},

FC denotes a frame configuration, NODE denotes a set of configuration nodes node in the frame configuration expressed by the configuration files of a J2EE application, wherein, node={id, VU, CP}, node denotes a configuration node in the frame configuration (e.g., an XML node in the configuration files in the XML format), id is a unique identifier of the configuration node, VU denotes the set of virtual code units comprised in the configuration node, CP denotes a set of connection patterns which the configuration node involves. For example, for the frame configuration file example shown in FIG. 1, a frame configuration model may be generated as follows: FC={Action, Bean, Select}, wherein, the details of the three nodes are shown in the following Table A.

TABLE A an example of frame configuration model wherein,
SQLFragment is the SQL statement fragment in the configuration file
fragment 102 in FIG. 1, i.e., "select CODEID, CODENAME, from
T_CODE where CODEID = #codeID#"

| ID | VU | CP |
|---|---|---|
| Action | UI4action, A5,success, UI5 | P 2: UI4action > A5<br>P 2: success > , UI5 |
| Bean | S2, service.s2, Daobean, D3 | P 1: S2 < service.s2,<br>P 1: Daobean < D3 |
| Select | code_getSingle, SQLFragment, get-codes-result,java.lang.Long | P 3: SQLFragment, > java.lang.Long<br>P 4: code_getSingle > SQLFragment<br>P 5: SQLFragment > get-codes-result |

In a subsequent step (Step 2), the mixed test case can be profiled. The aim of this step is to obtain extended control flows of the test cases in the test suite, i.e., the control flows taking into account the influences of the configuration files. A control flow expresses the control flow relationships between the executed ITAs during the execution process of a test case.

This step, in one embodiment, can comprise the following sub-steps:

Sub-step 2.1, profiling the execution of a test case, and constructing a control flow indicating the behavior of the test case; the control flow comprises the itas in the code traversed by the test case and the control flow relationships between them.

Profiling can be carried out using a existing trace monitor technique, and may take advantage of the various static program analysis methods described above. Preferably, profiling may be carried out in an actual testing process, and may be carried out by executing the test cases on the J2EE application under test before being modified. That is, during the process of using the test cases to execute the application under test before being modified, an existing trace monitor technique may be used, e.g., by performing instrumentation on the program under test, to obtain the call sequence of each test case to the respective program code units in the program under test. The control flow of a test case may be expressed by the following test case model:

Test case model: tc=(ITA, E), tc denotes the control flow of the test case, i.e., a set of code units traversed by the test case and the control flow relationship among the program code units, wherein:

ITA denotes a set of the program code units ita traversed by the test case; ita denotes a program code unit captured during the execution of the test case, including a Java method, Java class, JSP on-loading, HTML form submission, javascript function, Forward mapping string, Object Relation Mapping sql statements and so on. In the control flow constructed in the sub-step 2.1, ITA only comprises program code units, while in the extended control flow formed in the following sub-step 2.2, ITA may comprise both virtual code units and program code units.

E denotes a set of control flow relationships from all ita.pre to ita or from ita to ita.suc, wherein, the execution of the preceding program unit ita.pre will result in the execution of ita, and the execution of ita will result in the execution of the succeeding program unit ita.suc. For example, for the test case 2 shown in FIG. 1, the control flow tc generated by the trace monitor technique is UI4→A5→S5→D5→O3→DB1, wherein UI4, A5, S5, D5, O3, DB1 are the respective itas, and the directional arrows between them denotes the control flows among these itas. Therefore, E is the control flow relationship set {UI4→A5, A5→S5, S5→D5, D5→O3, O3→DB1}. Taking A5 as an example, UI4 is A5's preceding program unit A5.pre, and S5 is A5's succeeding program unit A5.suc.

In a Sub-step 2.2, correlating configuration nodes with the program code units. That is, according to the connection patterns comprised in the configuration nodes in the generated frame configuration model described above, add the virtual code units or the edges which the connection patterns involve to the control flow of the test case described above, so as to form an extended control flow of the test case, the extended control flow not only comprising the call sequence of the test case to the units in the program code, but also taking the influences of the configuration files on the call sequence into consideration.

According to an embodiment of the present invention, the correlation sub-step may use the following correlation algorithm for the control flow tc of a test case to obtain the extended control flow of the tc.

1) for each node in the frame configuration FC, traversing all the connection patterns of the node, and proceeding to step 2), 3), 4), 5) respectively according to different connection patterns.

2) for the connection pattern P1, assume that CUi is the program code unit in tc matching with VUi in FC (i.e., having the same ID), CUj is the program code unit in tc matching with VUj in FC. According to the meaning indicated by the connection pattern, the call to CUi in the program is carried out by the call to CUj. Therefore, an edge from CUi to CUj (an edge denotes the control flow relationship between the two code units) is added to indicate the relationship of inversion of control between VUi and VUj. For example, referring to Table A, in the exemplary configuration file fragment 102 shown in FIG. 1, D3 is VUj, daobean is VUi, when services.s2 calls daobean, it actually calls D3; however, using the existing trace monitor technique can only learn that service.s2 calls daobean. Here, D3 in tc of test case 3 is CUj, i.e., the program code unit matching with VUj; daobean in tc is CUi, i.e., the program code unit matching with VUi, so an edge from CUi to CUj, i.e., an edge from daobean to D3, needs to be added in tc to indicate this implied call (it should be pointed out that S2→D3 in the control flow of test case 3 shown in the left side of FIG. 1 is actually an abbreviate expression of S2→daobean→D3).

3) for the connection pattern P2, assume that CUj in tc is the program code unit matching with VUj in FC, CUi is the program code unit matching with VUi in FC. If CUi exists in tc, then add an edge from CUi to CUj. If CUi does not exist in tc, first add CUi in tc, then delete the edge from CUj's preceding node CUj.pre to CUj, and add an edge from CUj.pre to CUi, and finally add an edge from CUi to CUj. For example, in the exemplary configuration file fragment 101 show in FIG. 1, UI4action is VUi, A5 is VUj, which indicates that the call to A5 will be triggered after the call to UI4action. Both of the virtual code units have corresponding program code units in the program, but the call relationship between them is unknown in the program (since the call relationship between them is specified in the configuration file, and not in the program), so an edge should be added between the corresponding program code units in tc to indicate the call relationship between them; if UI4action does not exist in tc yet, then it is needed to first add UI4action in tc, delete the edge from A5's preceding node (e.g., UI4) to A5, add an edge from A5's preceding node to UI4action, and an edge from UI4action to A5.

4) for the connection pattern P3, add a new VUi in tc. Assume that CUj in tc is the program code unit matching with VUj, add an edge from VUi to CUj.

5) for the connection pattern P4, add a new VUj in tc. Assume that CUi in tc is the program code unit matching with VUi, add an edge from CUi to VUj. For example, in the exemplary configuration file fragment 103 shown in FIG. 1, code.getSingle is VUi, and code.getSingle in tc is the CUi corresponding to the VUi, the execution of which will actually call the VUj, i.e., the SQL code unit (SQLFragment) in the configuration file fragment. Since the program code unit CUj corresponding to the VUj does not exist in tc, a new VUj, i.e., SQL code unit, should be added in tc, and an edge from CUi to VUj should be added to indicate the hidden control flow relationship.

6) for the connection pattern P5, if both VUi and VUj already exist in tc (e.g., VUi and VUj have been added to tc by the above algorithm steps), then add an edge from VUi to VUj; if one of VUi and VUj does not exist in tc already, first add VUi or VUj which does not exist in tc, then add an edge from VUi to VUj. For example, in the exemplary configuration file fragment 103 shown in FIG. 1, for the pair of VUi and VUj, i.e. SQL unit and resultMap, that conform to the connection pattern P5, since SQL unit has already been added to tc in the above processing for the connection pattern P4, it is only needed to add VUj, i.e., resultMap, to tc, and then add an edge from the SQL unit to resultMap to indicate the control flow relationship from VUi to VUj.7) output the finally obtained tc, as the extended control flow of the test case. For example, for the test case 2 shown in FIG. 1, the control flow generated in the sub-step 2.1 before being extended is UI4→A5→S5→D5→O3→DB1. In the correlation sub-step 2.2, the connection pattern P2, i.e., UI4action→A5 is applied to the control flow, wherein, UI4action is VUi, A5 is VUj. Both VUi and VUj have corresponding program code units in the program; however, their call relationship is unknown in the program, so an edge should be added between the corresponding program code units in the control flow, to indicate the call relationship between them (if UI4action does not exist in the control flow of the test case yet, first it is needed to add UI4action in the control flow, delete the edge from A5's preceding node to A5, add an edge from A5's preceding node to UI4action, and then add an edge from UI4action to A5), to indicate that when UI4 calls A5, it is because the call to UI4action will trigger the call to A5. Thus, the extended control flow finally obtained is: UI4→UI4action→A5→S5→D5→O3→DB1.

While above is described a specific concrete algorithm for constructing the correlations between the configuration nodes and the program code units, it should be pointed out that the details in the above description are only exemplary, and not limitation to the present invention.

Figure 5A:
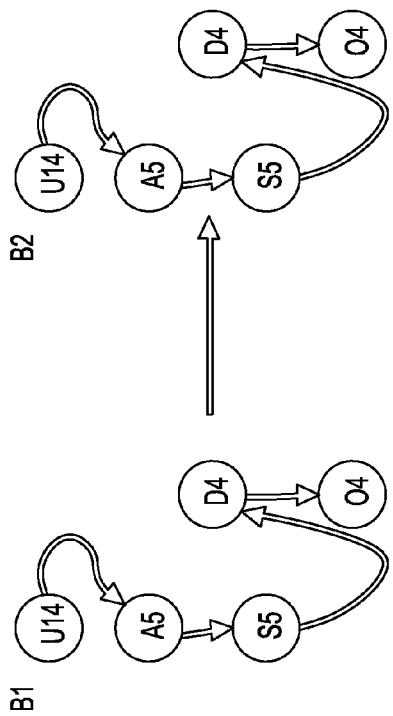
FIG. 5A is control flow illustration for an exemplary test case generated using unimproved trace monitor techniques.
Figure 5B:
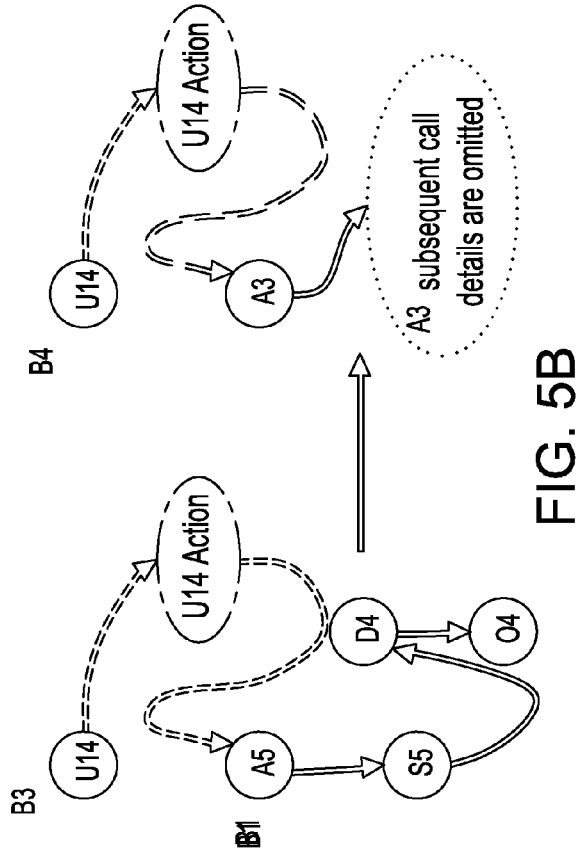
FIG. 5B is extended control flow diagram of a test case generated by the correlation step as per one embodiment of the present invention.

Now we can discuss the embodiments illustrated in FIGS. 5A and 5B. FIG. 5A illustrates a control flow for a test case generated with the existing trace monitor technique, wherein, B1 denotes the control flow of the test case before the program under test is modified, and B2 denotes the estimated control flow of the test case after the program under test is modified. By comparison, FIG. 5B is an illustrates of the extended control flow for the test case generated with the correlation step of the present invention, wherein, B3 denotes the extended control flow of the test case before the program under test is modified, and B4 denotes the estimated extended control flow of the test case after the program under test is modified. As shown in FIG. 5A, in B1 and B2, since the code of the program under test is not modified, and the influence of the changes of the configuration files is not considered, it is wrongly estimated that the control flow B2 after the program is modified is the same as the control flow B1 before the program is modified, so that the test case will not be selected to be re-executed. However, as shown in FIG. 5B, in B3, since the virtual code unit UI4action from the configuration file and an edge between it and the program code unit A5 are added, when the configuration file is modified, UI4action directs the control flow to A3 in stead of A5, the control flow B3 in the new version should be changed to the control flow denoted by B4, thus correctly indicating that the control flow of the test case will be changed in the new version, so that the tester can select this test case for regression testing. This can be considered as a subsequent step (step 3) as will be discussed below Step 3—Unified changes identification. In this step, changes in the program are identified by statically analyzing the original program P and the modified program P', and then the influences of these modifications on the extended control flow of the test cases are identified. The changes in the program are classified into two categories: language level modifications (LLM), i.e., modifications in the program code, and configuration level modifications (CLM), i.e., modifications in the configuration files (CLM). Both of the categories of modifications may affect the extended control flow of a test case. For both LLM and CLM, their influences on the extended control flow of the test case include changes to itas in tc, and changes to edges between itas. The unified change identification method proposed by the present invention conforms to the following formula:

unified changes={ITA changes∪edge changes}ITA
changes=C1∪C2}C1={ITA|ita belongs to CU
and ita.value has been changed}C2={ITA|ita is
VUi and VUi.value has been changed}edge
changes={C3∪C4∪C5∪C6}, before the calculation, it is needed to generate a frame configuration model instance FC' corresponding to P' according to the method of Step 1.

C3: {edgeij|edgeij denotes the edge of the control flow relationship from VUi to VUj, wherein one of VUi and VUj can find in CU the corresponding CUi or CUj. In the FC' corresponding to P', the virtual node VUi or VUj on the edge of control flow relationship from VUi to VUj has been changed to VUi' or VUj'} C4: {edgeij|edgeij denotes the edge of the control flow relationship from VUi to VUj, wherein, both of VUi and VUj may find in CU the corresponding CUi and CUj. In the FC' corresponding to P', the virtual nodes VUi or VUj on the edge of control flow relationship from VUi to VUj has been changed into VUi' or VUj'}C5: {edgeij|edgeij denotes the edge of the control flow relationship from VUi to VUj, wherein, neither VUi nor VUj has the corresponding CUi or CUj in CU, In the FC' corresponding to P', the virtual nodes VUi or VUj on the edge of control flow relationship from VUi to VUj has been changed to VUi' or VUj'} C6: {edgeij|edgeij denotes the edge of the control flow relationship from VUi to VUj.

In the FC' corresponding to P', there is no edge of the control flow relationship from VUi' to VUj' so that VUi'=VUi or VUj'=VUj, i.e., this edge is completely deleted in the new FC', in which none of the connection patterns comprises VUi or VUj} The step comprises the following sub-steps.

Sub-step 3.1, identifying changes of code by statically analyzing the original program files and the modified program files. All changes to language code resulting in changes in application logics will be identified. The sub-step may be carried out using existing static program analysis and comparison methods. For example, initialization changes of a public member variable used in a class member method will be considered as a program change.

For a test case that explicitly traversing a method deleted or added, there must exist a call entry deleted or added; therefore, only the deletion or addition of the call entry, instead of the deletion or addition of the method, will be considered. The change of the names of member variables, the addition, deletion and modification of comments, and modifications of formats will not cause changes in the application logics, so that they are not considered either. It should be noted that, changes in a method of a parent class will not be re-identified for each child class, since for the call to the inherited method in the child class, the trace monitor method will record the call to the method of the parent class, thus, none of the changed methods' execution will be ignored in the regression testing selection.

Sub-step 3.2, identifying the configuration changes of the J2EE application under test by analyzing and comparing the original configuration files and the modified configuration files of the J2EE application under test. In this sub-step, first the method described in the above Step 1 may be used to construct the frame configuration model instances of the application under test before and after being modified according to the original configuration files and the modified configuration files respectively, and then the changes in the frame configuration, e.g., the changes and replacements of the virtual code units in the configuration nodes etc., may be identified by comparing the frame configuration model instances before and after being modified.

Sub-step 3.3, determining the impacts of the identified code changes and configuration changes on the extended control flow of each test case. For the identified code changes, it is needed to judge whether the extended control flow of each test case comprises the changed program code units. So long as the extended control flow comprises the changed program code units, the extended control flow is influenced by the changes. Therefore, the test case needs to be re-executed for regression testing. Such code changes are C1.

For the identified configuration changes, it is needed to determine whether the extended control flow of each test case comprises corresponding changes based on the identified configuration changes. Specifically, based on the identified configuration changes, it is determined whether the extended control flow of each test case comprises the following 5 types of changes, i.e., C2, C3, C4, C5 and C6 caused by CLM:

C2 caused by CLM, which is the internal changes of virtual code units caused by the configuration changes, i.e., changes to the value of VUi. For example, the value of VUi in the configuration file is changed from "select CODEID, CODENAME, from T_CODE where CODEID=#codeID" to "select CODEID, CODENAME, from T_CODE where CODEID". Thus, in the extended control flow of the test case, VUi is identified as being changed.

C3 caused by CLM, which is the change of an edge in the extended control flow of the test case corresponding to the control flow from VUi to VUj caused by configuration changes, wherein one node of the edge has a corresponding program code unit, while the other node has no corresponding program code unit; when one of the two nodes on the corresponding edge of the control flow from VUi to VUj is changed in FC', this edge should be viewed as having been modified. It should be noted that C3 corresponds to the above connection patterns P3 and P4.

C4 caused by CLM, which is the change of an edge in the extended control flow of the test case corresponding to the control flow from VUi to VUj caused by configuration changes, wherein both nodes of the edge have corresponding program code units; when one of the two nodes on the corresponding edge of the control flow from VUi to VUj is changed in FC', this edge should be viewed as having been modified. It should be noted that C4 corresponds to the above connection patterns P1 and P2. For connection pattern P1, if the VUj that implements VUi in runtime is updated to VUj', the execution of VUi in the modified program will be carried out by the call to VUj'. Therefore, the edge from VUi to VUj in the extended control flow of the test case (i.e., the corresponding edge from CUi to CUD should be identified as a changed edge. For example, if the implementation class of VUi "daobean" is updated from VUj "D3" to VUj' "D4", then the edge "daobean→D3" that exists in the extended control flow of any test case should be identified as having been changed. For the connection pattern P2, assuming that VUj is updated to VUj' in FC', this update will make the flow from VUi to VUj to flow to VUj' in the modified program. For example, changing from A5 to A3 will cause U14action to flow to A3 in the modified program.

C5 caused by CLM, which is the change of an edge in the extended control flow of the test case caused by configuration changes, wherein both the virtual code units of the edge cannot find corresponding program code units in CU, and one virtual code unit on the edge of FC' has been modified. It should be noted that C4 corresponds to the above connection pattern P5. For example, if VUj "Get-Code-Result" is modified to a new VUj' "Get-Code-Result-new" in FC', then when SQL code unit (i.e., VUi) is executed in the control flow of the modified program, "Get-Code-Result-new" will be called, and thus it may be considered that the edge from the SQL code unit to "Get-Code-Result" has been changed.

It should be pointed out that, the above changes C3, C4 and C5 caused by CLM may be summarized as the change of an edge in the extended control flow caused by configuration changes, wherein one node of the edge is changed. C6 caused by CLM, i.e., after the configuration is changed, the edge is completely deleted in the new FC', and none of the connection patterns in FC' comprises VUi or VUj. This edge should be considered as having been changed. So long as the extended control flow comprises any one or more of the above 6 types of changes, the extended control flow is impacted by the changes; and accordingly, the test case to which the extended control flow corresponds needs to be re-executed for regression testing.

In a subsequent step—Step 4—test case selection is completed. In this step selects the test cases of which the extended control flow is changed, i.e., the test cases comprising any change of the above change types C1, C2, C3, C4, C5 and C6 from all the test cases, as the regression test suite to be re-executed. That is to say, for any test case, so long as the program code units or virtual code units it traverses are changed, or the edge connecting two virtual code units it traverses is changed in the new FC', or the edge is deleted in the new FC', the test case will be selected into the regression test suit to be re-executed. While above is described the regression testing selection method for a framework-based J2EE application according to embodiments of the present invention; it should be pointed out that, the above description is only exemplary illustration of embodiments of the present invention, rather than limitation to the present invention. The method of the present invention may have more, less or different steps; some of the steps may have different orders from that is described; some steps may be merged into larger steps, or may be divided into smaller steps, and so on. All these varieties are within the scope of the present invention.

Under the same inventive conception, the present invention provides a regression testing selection apparatus for a framework-based application, comprising: a frame analyzer for extracting a frame configuration model instance by analyzing the configuration files of a framework-based application before being modified, said frame configuration model instance describing the configuration nodes in the frame configuration of the application and the relationships between them and program code units; a test profiling engine for constructing a control flow of each test case by executing the test case and using trace monitoring, the control flow comprising the program code units traversed by the test case during its execution and the control flow relationships therebetween; and a node/code unit correlation engine for obtaining an extended control flow of each test case by correlating the configuration nodes in the frame configuration model instance with the program code units in the control flow.

Figure 6:
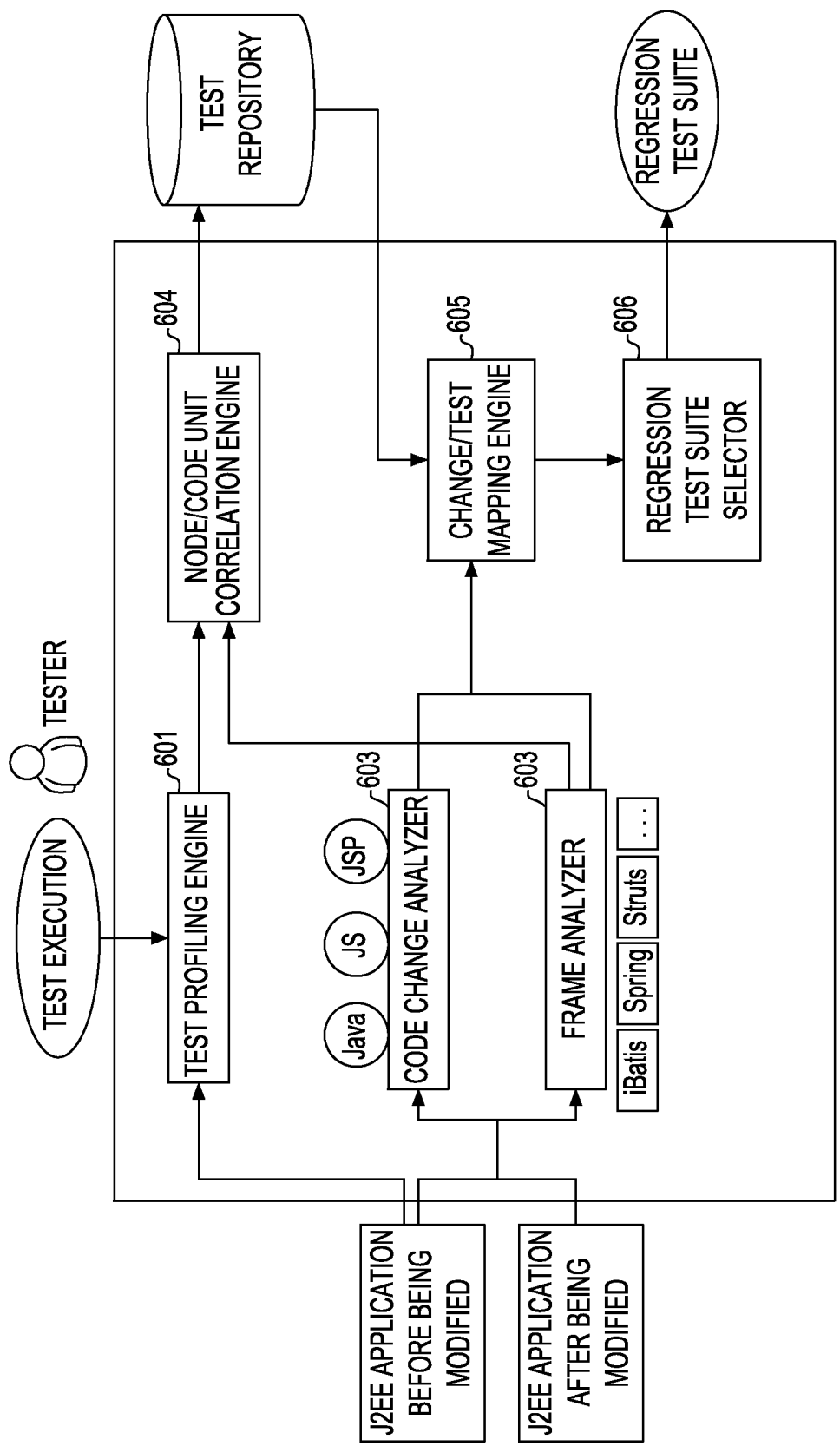
FIG. 6 is a block diagram illustrating an apparatus for regression testing selection as per one embodiment of the present invention used for a framework-based J2EE application.

Referring now to FIG. 6, the regression testing selection apparatus for a framework-based application according to an embodiment of the present invention will be described by taking a J2EE application as an example of applications. For conciseness, in the following description, some details repetitive with the above description are omitted; therefore, a more detailed understanding of the enhanced regression testing selection apparatus of the present invention may be better understood by referring to the above description.

As shown in FIG. 6, the regression testing selection apparatus for a framework-based application (e.g., J2EE application) according to an embodiment of the present invention comprises the following components: a test profiling engine 601, a frame analyzer 602, a code change analyzer 603, a node/code unit correlation engine 604, a change/test mapping engine 605, and an optional regression test suite selector 606.

The test profiling engine 601 is used to obtain the control flow of each test case in the test execution of the test case, i.e., the program units called by the test case in the J2EE application under test and their control flow. The J2EE application under test is the J2EE application under test before being modified. The test profiling engine 601 may be implemented by an existing trace monitoring tool and static program analysis technique.

The frame analyzer 602 is used to construct a frame configuration model of the J2EE application from the frame configuration files of the J2EE application, the frame configuration model reflecting the relationships between the configuration nodes in the frame configuration of the J2EE application and the code units they comprise, i.e., the connection patterns which each configuration node involves. The frame analyzer 602 needs to construct the frame configuration model according to the specific structures, syntaxes and semantics of configuration files specified by the specific J2EE frame. The specific structures, syntaxes and semantics of the configuration files specified by the specific J2EE frame (e.g., Spring, Structs, iBatis and so on) may also be referred to as the meta model of the frame. Before the frame analyzer 602 can process the frame configuration files of the specific frame, first the meta model of the frame can be used to configure the frame analyzer 602, so that the frame analyzer 602 can analyze the frame configuration files belonging to the frame according to the meta model of the frame, so as to construct the frame configuration model. For each type of frame, the frame analyzer 602 only needs to be configured once.

The relationship between the respective configuration nodes in the frame configuration of said J2EE application and the program code units is selected from the following 5 types of connection patterns P1-P5:

P1:  $VUi < VUj | (\exists CUi, CUi.ID = VUi.ID) \cap (\exists CUj, CUj.ID = VUj.ID)$ P2:  $VUi > VUj | (\exists CUi, CUi.ID = VUi.ID) \cap (\exists CUj, CUj.ID = VUj.ID)$ P3:  $VUi > VUj | (\exists CUj, CUj.ID = VUj.ID) \cap (\neg \exists CUi, CUi.ID = VUi.ID \cup (\exists CUi, CUi.ID = VUi.ID \cap CUi.Value \neq VUi.Value))$ P4:  $VUi > VUj | (\exists CUi, CUi.ID = VUi.ID) \cap (\neg \exists CUj, CUj.ID = VUj.ID \cup (\exists CUj, CUj.ID = VUj.ID \cap CUj.Value \neq VUj.Value))$ P5:  $VUi > VUj | (\neg \exists CUi, CUi.ID = VUi.ID) \cap (\neg \exists CUj, CUj.ID = VUj.ID)$ wherein, VUi and VUj denote code units expressed in the configuration files respectively; VUi.ID and VUj.ID denote the identifiers of VUi and VUj respectively; VUi.Value and VUj.Value denote the contents of the code fragments denoted by VUi and VUj respectively; CUi and CUj denote the code units in the program files respectively, CUi.ID and CUj.ID denote the identifiers of CUi and CUj respectively; CUi.Value and CUj.Value denote the contents of the code fragments of CUi and CUj respectively; "<" denotes a relationship of inversion of control, ">" denotes a control flow direction, "|" denotes a necessary condition for the pattern to be valid, "∩" denotes an "AND" relationship, "∪" denotes an "OR" relationship, "∃" denotes an existence quantifier, and "¬∃" denotes a non-existence quantifier.

The node/code unit correlation engine 604 is used to correlate the configuration nodes in the frame configuration model instance with the program code units in the control flow, so as to obtain an extended control flow of each test case. Specifically, the node/code unit correlation engine 604 may add the corresponding virtual code units or edges to the control flow of each test case according to the connection patterns of the configuration nodes in the constructed frame configuration model, to form the extended control flow of each test case. For example, the node/code unit correlation engine 604 may execute the following operations.

For connection pattern P1, assume that CUi is the program code unit in tc matching with VUi, and CUj is the program code unit in tc matching with VUj. According to the meaning expressed by the pattern, the call to CUi in the program is carried out by the call to CUj. Then an edge from CUi to CUj (an edge denotes the control flow relationship between two code units) is added to indicate the relationship of inversion of control between VUi and VUj.

For connection pattern P2, assume that CUj in tc is the program code unit matching with VUj in the pattern, and CUi is the program code unit matching with VUi in the pattern. If CUi exists in tc, then an edge from CUi to CUj is added. If CUi does not exist in tc yet, first add CUi in tc, then delete the edge from CUj's preceding node CUj.pre to CUj, and add an edge from CUj.pre to CUi, and finally add an edge from CUi to CUj.

For connection pattern P3, add a new VUi in tc. Assuming that CUj in tc is the program code unit matching with VUj, add an edge from VUi to CUj.

For connection pattern P4, add a new VUj in tc. Assuming that CUi in tc is the program code unit matching with VUj, add an edge from CUi to VUj.

For connection pattern P5, if both VUi and VUj already exist in tc, add an edge from VUi to VUj; if one of VUi and VUj does not exist in tc yet, first add VUi or VUj that does not exist in tc yet, and then add an edge from VUi to VUj.

Finally the obtained tc is outputted as the extended control flow of the test case. Optionally, the node/code unit correlation engine 604 may store the formed extended control flow of each test case in a test repository. The code change analyzer 603 is used to analyze and compare the program files of the J2EE application under test before and after being modified, and to identify any changes of program code units that results in changes of application logics. The code change analyzer 603 may be implemented by an existing program code analysis and comparing tool.

The frame analyzer 602 is further used to analyze and compare the configuration files of the J2EE application under test before and after being modified, and to identify changes in the configuration of the J2EE application under test. The frame analyzer 602 may first construct the frame configuration models of the J2EE application before and after being modified according to the configuration files of the J2EE application under test before and after being modified respectively, and identify changes in the frame configuration model, e.g., changes, replacements, etc. of virtual code units in configuration nodes, by comparing the frame configuration models of the J2EE application before and after being modified.

The change/test mapping engine 605 is used to determine the influences of the changes of program code units and changes of configuration on the extended control flow of each test case. Specifically, the change/test mapping engine 605 may determine the influences of the changes of program code units and changes of configuration on the extended control flow of each test case by mapping the identified changes of program code units and changes of configuration to the extended control flow of each test case.

Determining the influences of the changes of program code units on the extended control flow of each test case comprises determining whether the extended control flow of each test case comprises the changed program code units.

Determining the influences of configuration changes on the extended control flow of each test case comprises determining whether there are corresponding changes in the extended control flow based on the configuration changes. Specifically, the change/test mapping engine determines whether the extended control flow of each test case comprises one or more changes of the following three types of changes: an internal change of a virtual program unit comprised in the extended control flow due to the configuration changes; a change of an edge comprised in the extended control flow of the test case due to the configuration changes, wherein, one node of the edge is changed; deletion of an edge in the extended control flow of the test case due to the configuration changes.

The test suite selector 606 is used to select the test cases of which the extended control flows are changed due to influences by the identified code changes and configuration changes from all the test cases, as the test cases to be re-executed.

The above discussion provided for an apparatus that can be used for regression testing selection for a framework-based application according to one embodiments of the present invention. It should be pointed out that, the above description is only an exemplary illustration, rather than limitation to the method of present invention. The apparatus of the present invention may have more, less or different modules, and the modules can have relationships different from that is described. Some modules may be merged into larger ones, or divided into smaller ones. All these changes are within the scope of the present invention. In addition, the names of the modules are only specified for the convenience of description, and not limitation to the present invention.

Though the above discussions as discussed earlier, was applied to a framework-based J2EE application as example, the basic idea of the present invention is not limited to J2EE applications, and is applicable to the regression testing selection of a framework-based application of any language.

It should be noted that the present invention can be realized in hardware, software, or a combination thereof. The present invention can be realized in a computer system in a centralized manner, or in a distributed manner, in which, different components are distributed in some interconnected computer system. Any computer system or other apparatus suitable for executing the method described herein are appropriate. A typical combination of hardware and software can be a general computer system with a computer program, which when being loaded and executed, controls the computer system to execute the method of the present invention, and constitute the apparatus of the present invention.

In addition, the present invention can also be embodied in a computer program product, which can realize all the features of the method described herein, and when being loaded into a computer system, can execute the method.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A regression testing selection method executed by a processor for a framework based application having programming applications with both language program files and configuration files, said method comprising:
    abstracting a frame configuration model instance by analyzing configuration files prior to any modifications made to the program;
    said frame configuration model instance denoting individual configuration nodes in said framework model and further defining relationship between one or more code units in said configuration nodes and program code units in said application;
    constructing one or more control flow test cases by profiling select test cases of said application, wherein said control flow consists of code units traversed during test case execution and control flow of said code units; and
    obtaining an extended control flow by correlating configuration nodes in said framework configuration model instance with said code units in said control flow;
    identifying a test case to be run with a regression test suite selector after any modification is changed to the application wherein said test case includes an extended control flow;
    selecting a test case of which said extended control flow is changed as a test case to be re-executed after one or more modifications is made to said application; and
    wherein method of selecting said to be re-executed test case further comprises: identifying configuration files before and after modifications; determining impact of said identified configuration changes on said extended control flow of one or more test cases; and selecting a particular test case of which extended control flow is affected an identified configuration change and selecting it as said test case to be re-executed.

2. The method of claim 1, wherein the step of identifying configuration changes further comprises the steps off extracting frame configuration model instances before and after said modification by analyzing said configuration files before and after being modifications respectively; and identifying configuration changes of said application by comprising said frame configuration model instances before and after being modified.

3. The method of claim 1, wherein the step of determining the impact of said identified configuration changes on the extended control flow of a test case further comprises: determining whether there are corresponding changes in said extended control flow of said test case for the identified configuration changes.

4. The method of claim 1, further comprising: identifying code changes of said application by comparing sad program fields before and after modification determining whether there are a corresponding changes in said extended control flow of said test case for the identified configuration changes; and selecting said particular test case of which said extended control flow comprises changed code units as said test case to be re-executed.

5. A regression testing selection method executed by a processor for a framework based application having programming applications with both language program files and configuration files, said method comprising:
    abstracting a frame configuration model instance by analyzing configuration files prior to any modifications made to the program;
    said frame configuration model instance denoting individual configuration nodes in said framework model and further defining relationship between one or more code units in said configuration nodes and program code units in said application, wherein said application is a Java Enterprise Edition (J2EE) application and said relationships between said code unties comprises in the configuration nodes in the frame configuration of said J2EE application are selected from the following 5 connection patters P1-P5:
    P1: $VUi<VUj | (\exists CUi, CUi.ID=VUi.ID) \cap (\exists CUj, CUj.ID=VUj.ID)$
    P2: $VUi>VUj | (\exists CUi, CUi.ID=VUi.ID) \cap (\exists CUj, CUj.ID=VUj.ID)$
    P3: $VUi>VUj | (\exists\ CUj, CUj.ID=VUj.ID) \cap (\neg \exists CUi, CUi.ID=VUi.ID \cup (\exists CUi, CUi.ID=VUi.ID \cap CUi.Value \neq VUi.Value))$
    P4: $VUi>VUj | (\exists CUi, CUi.ID=VUi.ID) \cap (\neg \exists CUj, CUj.ID=VUj.ID \cup (\exists CUj, CUj.ID=VUj.ID \cap CUj.Value \neq VUj.Value))$
    P5: $VUi>VUj | (\neg \exists CUi, CUi.ID=VUi.ID) \cap (\neg \exists CUj, CUj.ID=VUj.ID)$
    wherein, VUi and VUj denote code units expressed in the configuration files respectively, VUi.ID and VUj.ID denote the identifiers of VUi and VUj respectively, VUi.Value and VUj.Value denote the contents of the code fragments denoted by VUi and VUj respectively; CUi and CUj denote code units in the program file respectively, CUi.ID and CUj.ID denote the identifiers of CUi and CUj respectively, CUi.Value and CUj.Value denote the contents of the code fragments of CUi and CUj respectively; "<" denotes a relationship of inversion of control, ">" denotes a control flow direction, "|" denotes a necessary condition for the pattern to be valid, "$\cap$" denotes an "AND" relationship, "$\cup$" denotes an "OR" relationship, "$\exists$" denotes an existence quantifier, and "$\neg \exists$" denotes a non-existence quantifier
    constructing one or more control flow test cases by profiling select test cases of said application, wherein said control flow consists of code units traversed during test case execution and control flow of said code units; and
    obtaining an extended control flow by correlating configuration nodes in said framework configuration model instance with said code units in said control flow.

6. The method of claim 5, wherein said configuration nodes in said frame configuration model instance are correlated with the code units in the control flow according to connection patterns involved in said configuration nodes.

7. The method of claim 6, wherein correlation of said configuration nodes in said frame configuration model instance with the code units in the control flow is made according to connection patterns involved in said configuration nodes wherein:
   a. for connection pattern P1, an edge is added from CUi to CUj in the control flow;
   b. for connection pattern P2, if CUi exists in the control flow, an edge is added from CUi to CUj; and if CUi does not exist in the control flow, adding CUi in the control flow, deleting the edge from CUj's preceding node CUj.pre to CUj, adding an edge from CUj.pre to CUi, and adding an edge from CUi to CUj;
   c. for connection pattern P3, VUi is added in the control flow, and an edge is added from VUi to CUj;
   d. for connection pattern P4, adding VUj in the control flow, and an edge is added from CUi to VUj; and
   e. for the connection pattern P5, if both VUi and VUj exist in the control flow, adding an edge from VUi to VUj; if one of VUi and VUj does not exist in the control flow yet, first adding VUi or VUj that does not exist in the control flow, and then an edge is added from VUi to VUj.

8. The method of claim 7, wherein existence of any corresponding changes in the extended control flow is determined by analyzing whether there is an internal change of a virtual code caused by configuration changes; or if there has been a change of an edge in the extended control flow, wherein a node of the edge is changed, or if deletion of an edge from extended control flow has caused any configuration changes.

9. A apparatus used for regression testing selection of a framework-based application having program files and configuration files and wherein the application is executed by a processor of the apparatus comprising:
   a frame analyzer configured to abstract a frame configuration model instance by analyzing the configuration files of the application before the application is modified;
   a test profiling engine configured to provide control flow of a particular test case to be tested;
   a node-code unit correlation engine configured to obtain an extended control flow by correlating nodes in said framework configuration model instance with said code units in said control flow;
   a regression test suite selector for, after the application is modified,
   selecting a test case of which the extended control flow is changed as a test case to be re-executed wherein said frame analyzer is further used for identifying configuration changes of the application by comparing configuration files of the application before and after being modified;
   wherein said frame configuration model instance denotes individual nodes in said framework configuration and provides relationship information between said configuration nodes and code units included in said configuration nodes; and
   wherein said test feature profiling engine uses trace monitoring in its execution so that said control flow is constructed by code unties of said program files being traversed by said test case during its execution and control flow relationships between said code units.

10. The apparatus of claim 9, wherein said node-code engine also obtains an extended control flow of test cases by profiling runtime of such test cases over application and said control flow consists of code unites traversed during test case execution and control flow of code units.

11. The apparatus of claim 10, wherein any modified test case is to be re-executed after modifications are made to said application.

12. The apparatus of claim 11, wherein the frame analyzer is further used for identifying configuration changes of the application by comparing configuration files of the application before and after being modified; said apparatus further comprises a change/test mapping engine for determining influences of the configuration changes identified by the frame analyzer on the extended control flow of the test case.

13. The apparatus of claim 12, wherein the test case suite selector selects a test case of which the extended control flow is influenced by the identified configuration changes as a test case to be re-executed.

14. The apparatus of claim 12, wherein the frame analyzer is used for extracting the frame configuration model instances before and after being modified by analyzing the configuration files of the framework-based application before and after being modified respectively and also identifying the configuration changes of the application by comparing the frame configuration model instances before and after being modified.

15. The apparatus of claim 9, wherein the change/test mapping engine is used for: for the identified configuration changes, judging whether there are corresponding changes in the extended control flow.

16. The apparatus of claim 15, further comprising:
   a code change analyzer for identifying the code changes of the application by comparing the program files of the application before and after being modified;
   a change/test mapping engine for judging for the identified code changes whether the extended control flow of the test case comprise changed code units, wherein, said regression test suite selector is further used for selecting a test case of which the extended control flow comprises changed code units as a test case to be re-executed.

* * * * *